April 29, 1924.

G. W. GILLESPIE ET AL 1,492,446

ANCHOR FOR ANTISKID DEVICES

Filed April 28, 1923

INVENTORS
George W. Gillespie
Elbert W. Denson
BY

Geo. P. Kimmel ATTORNEY.

Patented Apr. 29, 1924.

1,492,446

UNITED STATES PATENT OFFICE.

GEORGE W. GILLESPIE AND ELBERT W. DENSON, OF ANN ARBOR, MICHIGAN.

ANCHOR FOR ANTISKID DEVICES.

Application filed April 28, 1923. Serial No. 635,313.

*To all whom it may concern:*

Be it known that we, GEORGE W. GILLESPIE and ELBERT W. DENSON, citizens of the United States, residing at Ann Arbor, in the county of Washtenaw and State of Michigan, have invented certain new and useful Improvements in Anchors for Antiskid Devices, of which the following is a specification.

This invention relates to anchors for antiskid devices, more particularly to a securing means for anti-skid chains for use in connection with motor vehicle wheels to prevent skidding of the vehicle, and has for its object to provide, in a manner as hereinafter set forth, means for quickly applying an anti-skid device, such as a chain, with respect to the tire of the wheel of a motor vehicle and further for securely holding the chain in position after it has been applied.

Further objects of the invention are to provide a device for the purpose set forth, which is simple in its construction and arrangement, strong, durable, compact, thoroughly efficient in its use, conveniently applied and inexpensive to set up.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
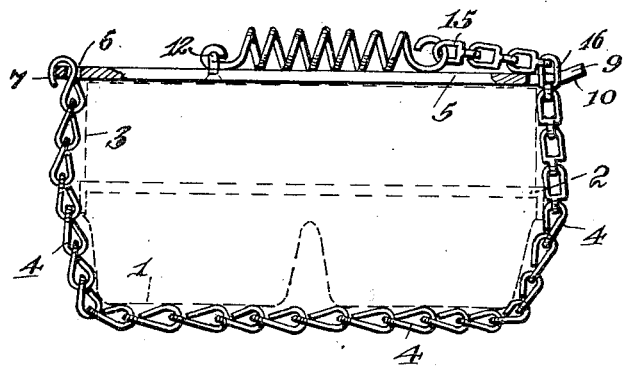
Figure 1 is an elevation of an anti-skid anchoring device, in accordance with this invention, showing the adaptation thereof in connection with the tire of a motor truck.

Referring to the drawings in detail, 1 denotes a tire, 2 a rim and 3 a felly. Extending around the tire 1 is an anti-skid device in the form of a chain, as indicated at 4, and which is connected in position, or rather anchored with respect to the tire 1, in a manner to be presently referred to.

Figure 2:
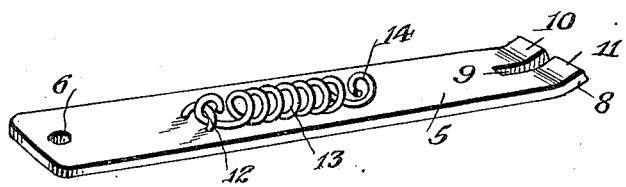
Figure 2 is a perspective view of the anchor.

The anchoring device, as shown in Figures 1 and 2 and which is employed in connection with truck wheels, consists of a flat plate 5, positioned against the inner face of the felly 3 and of a length to project from each side of the felly 3, as clearly shown in Figure 1. One end of the plate 5 is formed with an opening 6, in which is detachably connected a hook 7 at one end of the chain 4, as shown in Figure 1.

The other end of the plate 5 is upturned at a slight inclination, as at 8, and the said end is further bifurcated, as at 9, to provide the furcations 10 and 11.

The inner face of the plate 5 has fixedly secured therewith a staple 12, to which is attached one end of a coiled spring 13 and the latter has its other end, as at 14, connected with a link 15 at the other end of the chain 4.

When the chain 4 is mounted in position with respect to the tire 1, the hook 7 is connected with the opening 6 at one end of the plate 5, and a link of the chain 4, as indicated at 16 extends up through the furcations 10 and 11, and the chain 4 is then extended upon the plate 5 and connected to the end 14 of the spring 13.

The spring 13 sets up a resilient connection between the chain 4 and the plate 5 and furthermore, tends to maintain the chain in contact with the tire 1.

Figure 3:
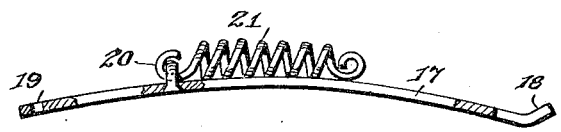
Figure 3 is a longitudinal sectional view of a modified form of anchor of a type employed in connection with the tire of an automobile.

Referring to Figure 3 of the drawings, an anchoring device is set up for use in connection with automobiles and it consists of a skeleton segment-shaped plate 17, provided with a bifurcated end 18 and an apertured end 19 and further provided with a staple 20 having a coiled spring 21 connected therewith. The manner in which the modified form shown in Figure 3 is employed is similar to that referred to in connection with the form shown in Figure 1, the only difference between the two constructions is that the plate 17 is made somewhat lighter than the plate 5 and is of skeleton contour.

The plate 5 or 17, when set up with respect to the felly will not turn and will tend to maintain the chain in position, and owing to the employment of the coiled spring, it reduces the breaking of the chains to a minimum, as the chains can yield when coming in contact with an obstruction and when passing the obstruction the chain will resume its normal position, and this yielding is due to the fact that the link 16 can shift laterally in the bifurcated end of the plate.

Although the preferred embodiment of the invention is as described and claimed, yet it will be understood that changes in the details of construction can be had which will fall within the light of the invention as claimed.

What we claim is:—

1. An anchor for an anti-skid chain comprising a plate provided at one end with means for connecting the chain therewith and further having its other end bifurcated for the passage of the other end of the chain, and a resilient member connected to the plate and adapted to be attached to the last mentioned end of the chain.

2. An anchor for an anti-skid chain comprising a plate provided at one end with means for connecting the chain therewith and further having its other end bifurcated for the passage of the other end of the chain, and a resilient member connected to the plate and adapted to be attached to the last mentioned end of the chain, that end of said plate which is bifurcated being angularly disposed with respect to the remaining portion of the plate.

3. An anchor for an anti-skid chain comprising a plate adapted to be positioned against the inner face of the felly and of greater length than the width of the felly, said plate having one end provided with an opening for coupling one end of a chain therewith and its opposite end bifurcated for the passage of the other end of the chain, and a resilient element having one end fixed to said plate and adapted to have its other end connected to the last mentioned end of the chain.

4. An anchor for an anti-skid chain comprising a plate adapted to be positioned against the inner face of the felly and of greater length than the width of the felly, said plate having one end provided with an opening for coupling one end of a chain therewith and its opposite end bifurcated for the passage of the other end of the chain, and a resilient element having one end fixed to said plate and adapted to have its other end connected to the last mentioned end of the chain, the bifurcated end of said plate being angularly disposed with respect to the remaining portion of said plate.

5. An anchoring device for an anti-skid chain comprising a plate provided at one end with an opening and at its other end with a plurality of furcations, a resilient element positioned on the inner face of the plate, means for connecting one end of said element to the plate, said opening providing means for connecting one end of an anti-skid chain therewith, said furcations providing means for the passage of the chain through one end of the plate and said resilient member adapted to have its other end connected with that end of the portion of the chain which is passed between said furcations.

6. An anchoring device for an anti-skid chain comprising a plate adapted to be positioned against the inner face of a felly and provided with means at one end for connecting one end of an anti-skid chain therewith and its other end with means for passing the anti-skid chain therethrough, and a resilient element for connecting the other end of the anti-skid chain with the plate.

In testimony whereof, we affix our signatures hereto.

GEORGE W. GILLESPIE.
ELBERT W. DENSON.